United States Patent [19]
Ludin et al.

[11] 3,933,223
[45] Jan. 20, 1976

[54] BEARING LUBRICATED WITH WATER

[76] Inventors: Ludwig Ludin, Kesselackerweg, CH-5611 Anglikon-Wohlen, Switzerland; Nikolaus Laing, Hofener Weg 35-37, D-7141 Aldingen bei Stuttgart, Germany

[22] Filed: Nov. 26, 1973

[21] Appl. No.: 419,215

[30] Foreign Application Priority Data
Nov. 28, 1972  Austria .............................. 10107/72

[52] U.S. Cl. ................................................. 184/7 R
[51] Int. Cl.² ........................................ F01M 1/06
[58] Field of Search ............... 184/1 E, 1 R, 7 R, 8; 308/76, 77; 62/279, 280, 281, 285, 286, 331

[56] References Cited
UNITED STATES PATENTS

| | | | |
|---|---|---|---|
| 2,170,667 | 8/1939 | Smitmans............................ | 308/76 |
| 2,257,359 | 9/1941 | Williams.............................. | 184/1 E |
| 3,097,027 | 7/1963 | Mims et al. ........................ | 308/77 X |
| 3,318,107 | 5/1967 | Riley et al. ......................... | 62/285 X |
| 3,333,907 | 8/1967 | Lamb................................... | 308/77 |
| 3,498,077 | 3/1970 | Gerard et al. ...................... | 62/285 X |
| 3,651,660 | 3/1972 | Quiros ................................ | 62/281 X |

*Primary Examiner*—Wendell E. Burns
*Assistant Examiner*—James D. Liles
*Attorney, Agent, or Firm*—Pennie & Edmonds

[57] ABSTRACT

Water for the lubrication of a bearing is obtained from a heat sink in the vicinity of the bearing. The temperature of the heat sink is below the dew-point of the surrounding air.

5 Claims, 2 Drawing Figures

BEARING LUBRICATED WITH WATER

THE PRIOR ART

Bearings lubricated with water are generally known, such bearings being used particularly in pump constructions. One advantage of water lubrication lies in the fact that, owing to its low viscocity, water causes only very small friction forces. Furthermore, water does not cause an accumulation of dust and dirt particles near the bearing to the same extent as oil and, therefore, makes economically practicable an enduring troublefree operation of the bearing. The use of water-lubricated bearing in machines is advantageous particularly when the machine already has a water supply for functional reasons. Some applications, however do not utilizes water for functional reasons, so that the supply of the bearing with water becomes a problem. The invention is concerned to solve this supply problem.

THE OBJECT OF THE INVENTION

The aim of the invention is a device to provide a supply of water for the lubrication of bearings which do not operate in an aquaeous medium.

DESCRIPTION OF THE INVENTION

One feature of the invention resides in arranging a heat sink in the vicinity of the bearing. The temperature of the heat sink lies below the dew point of the ambient air such that water is collected at the heat sink by the condensation of the water vapour contained in the air. This water is then used for lubricating the bearing.

The transport of the water from the heat sink to the bearing is accomplished by absorbent materials, e.g. wicks or other capillary means or via suitable pipeline systems using gravity or other forces.

Devices by which temperatures below the dew point of the air can be generated serve as heat sinks. Peltier elements, for example, may be found suitable for this purpose.

In machines which are combined with refrigeration engines, heat withdrawal resulting in collecting the lubricating water may be effected by the heat carrier of the refrigeration engines. If the heat carrier pipeline is too far away from the bearing, a portion of the heat carrier can, by a suitable by-pass, be provided with a good heat conducting connection to the bearing or to the corresponding heat sink. In cold vapour engines, e.g. in refrigerating cabinets or air conditioning appliances, it is possible to perform cooling not only by a single capillary but alternatively by other appropriate expansion means or cooling means having corresponding performance which are preferably placed in the immediate vicinity of bearings. In this manner, it is possible to cool the bearing itself or its immediate surroundings so that the water condenses directly at the required places and a ducted supply of water is not necessary.

In machines which are not associated with refrigerating units and which have a large number of bearings, as for example, in conveyor belts or in machines which contain bearings with a large demand for lubricant, as for example, in large fans, the necessary cooling performance can be provided by installing a cooling unit specifically to perform the required service. The transfer of heat from the heat sinks near the bearing to the refrigerating unit can be accomplished by a liquid heat carrier, e.g. a salt solution conducted in an open-loop or closed-loop circuit.

DETAILED DESCRIPTION OF THE DRAWINGS

Figure 1:
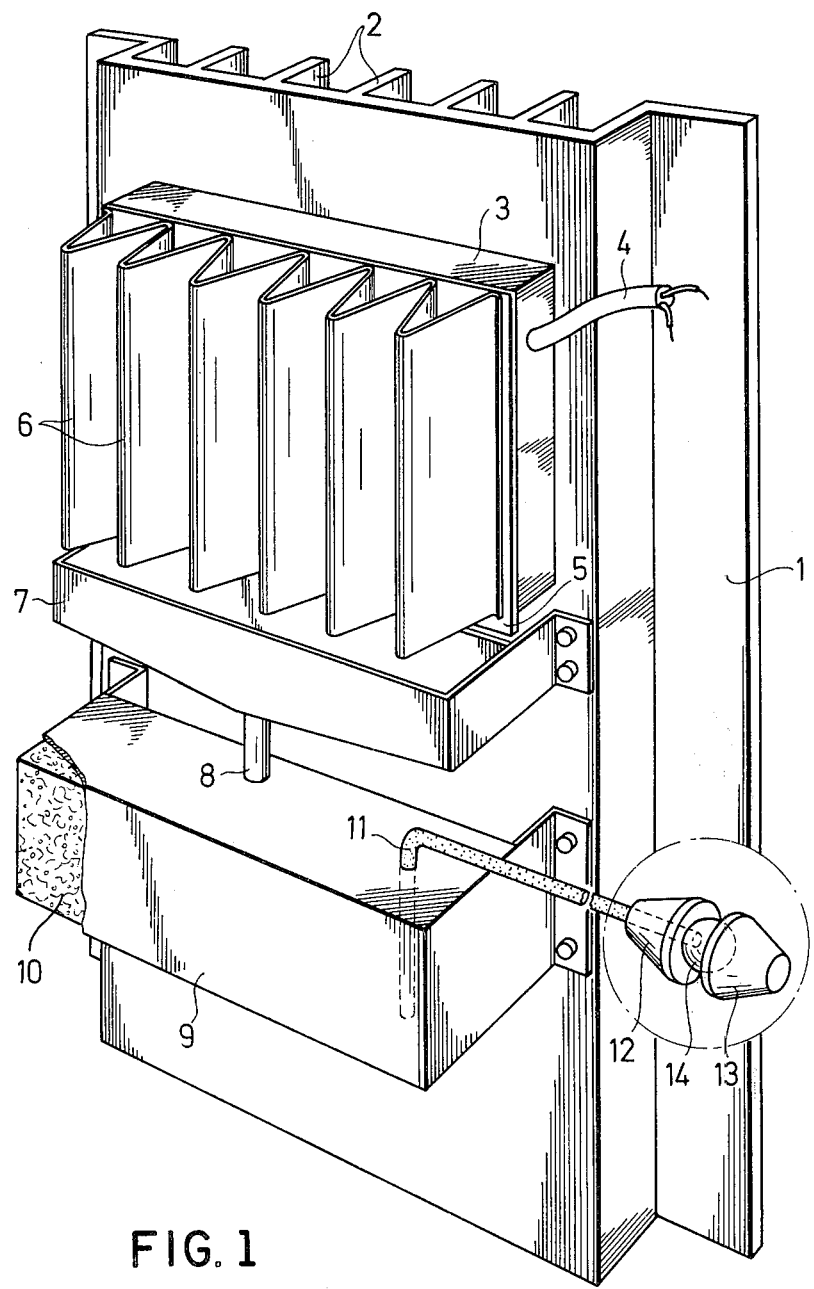
FIG. 1 is a perspective view of a water bearing and water cooling means of the invention.

The invention is explained with the help of the accompanying drawings which illustrates diagrammatically in perspective an embodiment capable of lubricating water condensation.

A block 3 with Peltier elements or other heat-energy obstructing means, is arranged on a mounting plate 1 with reinforcing webs 2. The block 3 may be connected with the cable 4 to the appropriate electrical network. The cold poles of the Peltier elements cool a plate 5 and fins 6 connected to it in good thermally conducting manner. The lubricating water condensing on the plate 5 and the fins 6 drips into a trough 7 attached to the mounting plate 1. Thence it flows via a pipe 8 into a box 9 filled with an absorbent material 10, e.g. a synthetic sponge foam. The lubricating water is conducted by a wick 11 from the material 10 to the bearing, which is diagrammatically indicated by the cups 12 and 13 and a bearing ball 14. The wick is taken up to the bearing ball through the centre of one bearing cup (12 in the drawing). Clearly the wick 11 may be doubled, leading to the cups 12 and 13.

Figure 2:
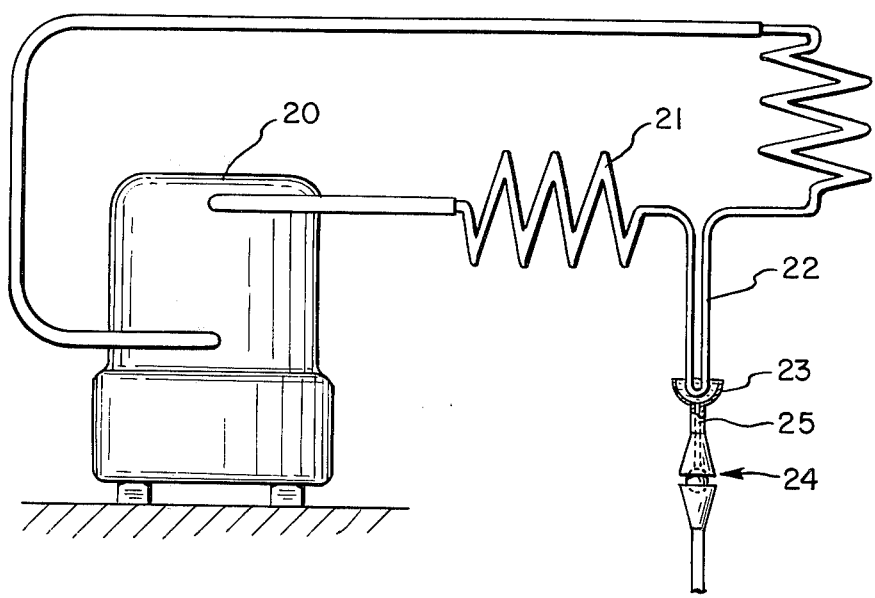
FIG. 2 is a schematic arrangement of an apparatus for cooling the ambient air surrounding the expansion vessel below its dew point.

As shown in FIG. 2, a compressor 20 serves to compress a liquid heat carrier which is then cooled in the evaporator section 24 and allowed to expand in the expansion vessel 22. This serves to cool ambient air surrounding the expansion vessel below its dew point. Condensation will collect on the sides of the expansion vessel 22 and drop into collection trough 23 where it is carried to the bearing assembly 24 by means of the conduit 25. The liquid heat carrier is again cooled in the expansion section 22 and wherein the expansion acts as a cooling device.

We claim:

1. Bearing in combination with a rotating machine in which the cooperative sliding elements of the bearing moveable relative to each other are lubricated by water and wherein the rotating machine is surrounded in part by ambient air containing moisture, the improvement comprising having a heat sink in thermal contact with said ambient air and, means whereby the heat sink may absorb heat from the air and cool it below its dew point to condense water therefrom, and means extending from said heat sink to said bearing for collecting and conveying the condensed water from said heat sink to said bearing.

2. Bearing in combination with a rotating machine according to claim 1 wherein the heat sink comprises a Peltier element.

3. Bearing in combination with a rotating machine according to claim 1 wherein the heat sink comprises an expansion vessel of an installation operating with a refrigerant.

4. Bearing in combination with a rotating machine according to claim 1, the improvement further comprising having a liquid heat carrier means for withdrawing heat from said heat sink and a cooling device for cooling said liquid heat carrier.

5. Bearing in combination with a rotating machine according to claim 1 wherein said means extending from said heat sink to said bearing comprises a high capillary material.

* * * * *